United States Patent [19]

Yonezawa et al.

[11] Patent Number: 4,791,256

[45] Date of Patent: Dec. 13, 1988

[54] INSULATED NOZZLE FOR USE IN AN INTERRUPTER

[75] Inventors: Takashi Yonezawa; Toshiaki Yoshizumi; Mamoru Hosomi; Akiyoshi Onuma; Ichiro Yamasaki, all of Amagasaki, Japan

[73] Assignee: Mitsubishi Denki Kabushiki Kaisha, Japan

[21] Appl. No.: 117,640

[22] Filed: Nov. 5, 1987

[30] Foreign Application Priority Data

Nov. 7, 1986 [JP] Japan .................... 61-263897

[51] Int. Cl.$^4$ .............................................. H01H 33/02
[52] U.S. Cl. ............................ 200/148 R; 200/144 C; 200/148 A; 200/148 G
[58] Field of Search ........... 200/148 G, 148 A, 144 C

[56] References Cited

FOREIGN PATENT DOCUMENTS 0066298 8/1982 European Pat. Off. .
58-178931 10/1983 Japan .

Primary Examiner—Robert S. Macon
Attorney, Agent, or Firm—Leydig, Voit & Mayer

[57] ABSTRACT

In an interrupter, an insulated nozzle is disposed in the vicinity between a pair of contact elements and is adapted to extinguish an arc occurring between the contact elements by blowing an insulating gas thereto. This insulated nozzle is formed from a fluoroplastic and boron nitride mixed thereinto, the mixed proportion of boron nitride being within a range of weight percentages of 0.3 to 1.0.

2 Claims, 2 Drawing Sheets

INSULATED NOZZLE FOR USE IN AN INTERRUPTER

BACKGROUND OF THE INVENTION

This invention relates to an insulated nozzle for use in an interrupter.

In a puffer type of interrupter, an insulated nozzle is disposed in the vicinity of a position between a movable electrode and a fixed electrode at which an arc occurs when the interrupter interrupts a current. The insulated nozzle is adapted to blow $SF_6$ gas into the arc, thereby reducing the period of time required to extinguish the arc.

With this type of interrupter, when the current is interrupted, an arc in the form of a high-temperature plasma occurs between the movable electrode and the fixed electrode. Conventionally, to extinguish this arc, a flow of gas, such as air or $SF_6$ gas, is blown from a nozzle made of a fluoroplastic having insulating properties. However, there arises a problem in that when an insulator covering the nozzle surface is exposed to the arc in the form of a high-temperature plasma, the insulating property of the insulator is greatly reduced by energy lines which are generated by the arc and which not only reach the surface of the insulator but also enter thereinside so as to produce voids or deposited carbon on the surface or interior of the nozzle.

With a view to eliminating this problem, there has been disclosed an interrupter having a fluoroplastic insulator into which an inorganic filler in the form of a powder having a particle size of 3 to 20 μm is mixed to a volumetric percentage of 10 to 80. For example, such a filler is formed of metal such as bronze or a metal oxide such as silicon oxide, titanium oxide or aluminum oxide. The thus produced resin insulator used in this interrupter is improved in the internal arc-resistant characteristics, which are realized by mixing a large proportion of an inorganic filler into the resin so as to provide shield against the arc's energy lines. Therefore, this insulator is effective for improving the withstand-voltage performance after repeated current interruptions. Various materials have been used as inorganic fillers to be mixed into fluoroplastic. It has been proved that boron nitride is, from the viewpoint of insulating properties and heat conductivity, one of the most suitable fillers to be mixed into the material of an insulated nozzle for use in an interrupter of ultra-high voltage ratings. For example, Japanese Patent Laid-Open No. 58-178931 discloses the fact that, if a volumetric ratio of 1 to 30 percent of boron nitride is mixed into the resin insulator, the withstand-voltage performance after repeated current interruptions is improved.

The above-described type of insulated nozzle for use in an interrupter is formed from a fluoroplastic having an inorganic filler mixed therein at a comparatively high mixing ratio in order to improve the withstand-voltage performance after repeated current interruptions. However, as is well known, if the proportion of the added inorganic filler increases, the rate at which the insulated nozzle is consumed increases, resulting in deterioration in the current interruption performance. Therefore, if the proportion of the added inorganic filler is increased in order to improve the withstand-voltage performance, the interruption performance after repeated current interruptions is reduced, and it is thus difficult to improve both the withstand-voltage performance and the interruption performance while keeping them in balance.

SUMMARY OF THE INVENTION

The present invention has been achieved with a view to overcoming these problems, and an object of the present invention is to provide a insulated nozzle for use in an interrupter in which the withstand-voltage performance and the current interruption performance after repeated current interruptions can be improved in a balanced manner, and which is most suitable for frequent current interruptions.

In order to achieve the above object, according to one aspect of the present invention, there is provided in an interrupter an insulated nozzle disposed between a pair of contacts between which an arc occurs and adapted to extinguish the arc by blowing an insulating gas into the arc, the insulated nozzle comprising a fluoroplastic and a boron nitride mixed into the fluoroplastic at a weight percentage ranging from 0.3 to 1.0.

In accordance with the present invention, the withstand-voltage performance after repeated current interruptions is improved while the rate at which the interruption performance after repeated current interruptions is reduced is very limited due to a small proportion of mixed boron nitride, thus improving both of these performances while balancing them well.

DESCRIPTION OF PREFERRED EMBODIMENT

In an insulated nozzle made of a fluoroplastic in which boron nitride is mixed as a filler, the degree of generation of voids (internal defects) or carbon deposition due to current interruption is small when compared with a fluoroplastic nozzle having no boron nitride content. The insulating properties are improved by mixing boron nitride at a suitable amount. However, the present inventors confirmed by experiments that an increase in the proportion of mixed boron nitride increases the permittivity of the insulated nozzle and the amount of voids, thus resulting in deterioration in the withstand-voltage performance. This deterioration in the withstand-voltage performance occurred when the proportion of mixed brron nitride exceeded a weight percentage of 1.

Figure 1:
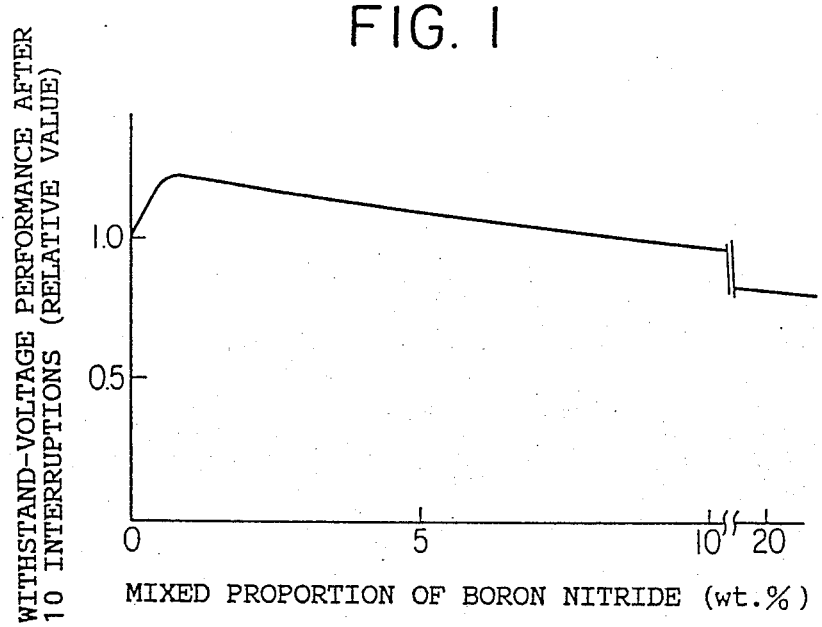
FIG. 1 is a graph showing the relationship between the proportion of boron nitride mixed in a fluoroplastic forming an insulated nozzle and the withstand-voltage performance of this nozzle.
Figure 2:
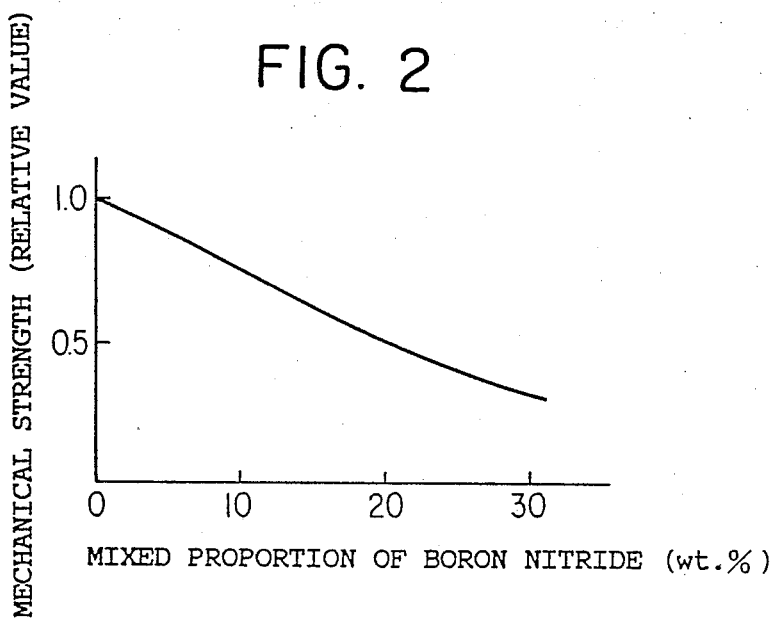
FIG. 2 is a graph showing the relationship between the proportion of boron nitride and the mechanical strength.
Figure 3:
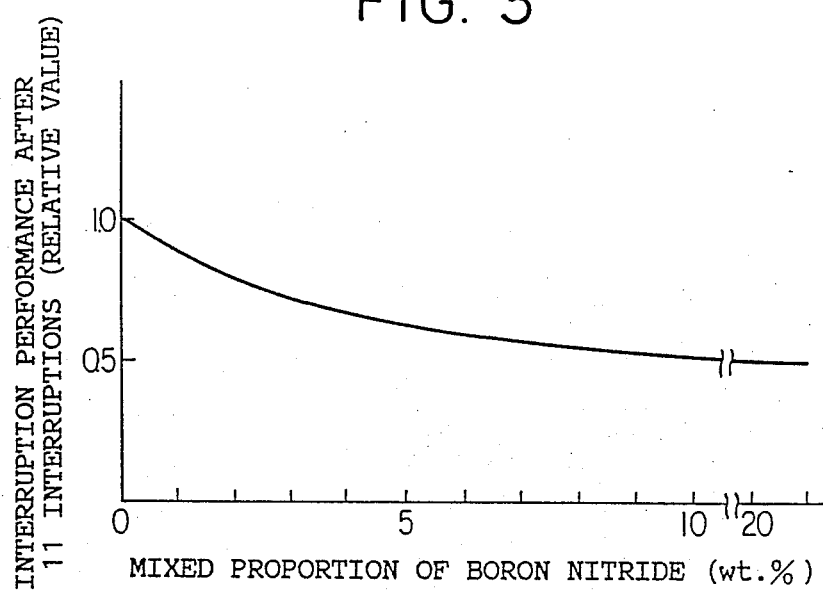
FIG. 3 is a graph showing the relationship between the proportion of mixed boron nitride and the interruption performance.
Figure 4:
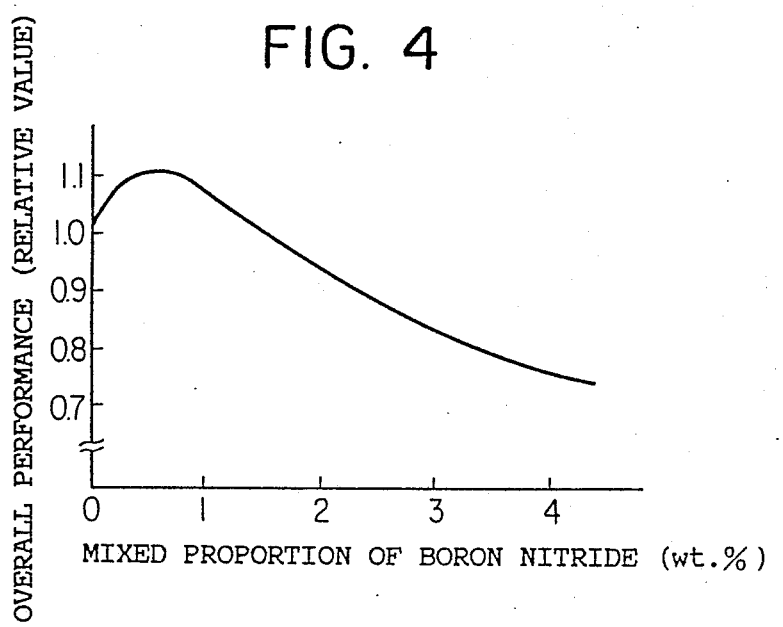
FIG. 4 is a graph showing the relationship between the proportion of mixed boron nitride and the overall performance obtained from the withstand-voltage performance shown in FIG. 1 and the interruption performance shown in FIG. 3.

FIG. 1 is a graph showing the above relationship, confirmed by experiment, between the proportion of boron nitride mixed into a fluoroplastic forming an insulated nozzle and the withstand-voltage performance of this nozzle after 10 current interruptions at 50 kA for 17 ms. The relative value on the ordinate is based on a fluoroplastic having no boron nitride content (the same relationship is shown in FIGS. 2 to 4). As shown in FIG. 1, the curve, which indicates the withstand-voltage, has a peak when the proportion or mixed amount of filler boron nitride is at a weight percentage of less than 1 and remains at a high value over the range of about 1 to 3.

On the other hand, as shown in FIG. 2, the mechanical strength decreases gradually as the proportion of mixed boron nitride increases. It is therefore preferable to reduce the proportion of mixed boron nitride in terms of the mechanical strength.

It is also known that, if the proportion of mixed boron nitride increases, the interruption performance deteriorates after the interrupting operation has been repeated many times. This phenomenon can be explained as follows. If the insulated nozzle contains boron nitride, energy lines, which are generated by an arc occurring when the current is interrupted, are obstructed by the shielding effect which is achieved by boron nitride diffused in the insulated nozzle so that the energy lines do not reach internal portions of the insulated nozzle. The internal arc-resistance of the insulated nozzle is thereby increased. On the other hand, in a surface layer portion of the insulated nozzle which is exposed to the arc, the energy line absorption density increases so that the insulated nozzle is easily consumed from the surface layer. The consumption of the insulated nozzle widens gas flow passage (increases the inside diameter of the insulated nozzle), and the accumulation of the puffer cylinder pressure necessary for current interruption becomes insufficient, thus deteriortating the interruption performance. FIG. 3 shows the relationship between the proportion of mixed boron nitride and the interruption performance after 11 current interruptions at 50 kA for 17 ms. For these reasons, a reduced proportion of mixed nitride insures higher interruption performance.

FIG. 4 shows the relationship between the proportion of mixed boron nitride and the overall performance which is obtained from the withstand-voltage performance shown in FIG. 1 and the interruption performance shown in FIG. 3. As can be understood from FIG. 4, the overall performance is maximized when mixed boron nitride is at a weight percentage of about 0.5 to 0.8, and is higher than that achieved by a fluoroplastic having no boron nitride mixed therewith when the proportion of mixed boron nitride is within a range of weight percentages of 0.3 to 1.0.

From the viewpoint of the mechanical strength, which is not considered in the case shown in FIG. 4, it is preferable to decrease the proportion of mixed boron nitride. In consideration of the manufacturing cost, it is also preferable to decrease the proportion of mixed boron nitride because boron nitride is more expensive than fluoroplastic. Accordingly, the insulated nozzle in accordance with the present invention, which contains boron nitride within the range of weight percentages of 0.3 to 1.0, is superior in mechanical strength and cost than the conventional insulated nozzle, which contains boron nitride at a volume percentage ranging from 1 to 30.

While a presently preferred embodiment of the present invention have been shown and described herein, it will be apparent to those skilled in the art that various changes and/or modifications thereof can be made without departing from the spirit and scope of the invention as defined in the appended claims.

What is claimed is:

1. An insulated nozzle disposed between a pair of contacts of an interrupter and adapted to extinguish an arc occurring between said pair of contacts by blowing an insulated gas into the arc, said insulated nozzle comprising:
   a fluoroplastic; and
   a boron nitride mixed into said fluoroplastic at a weight percentage ranging from 0.3 to 0.8.
2. An insulated nozzle as claimed in claim 1 wherein the proportion of said boron nitride mixed into said fluoroplastic is preferably at a weight percentage ranging from 0.5 to 0.8.

* * * * *